(12) United States Patent
Naito

(10) Patent No.: US 7,611,000 B2
(45) Date of Patent: Nov. 3, 2009

(54) DAMPING FORCE ADJUSTING STRUCTURE OF HYDRAULIC SHOCK ABSORBER

(75) Inventor: Tutomu Naito, Saitama (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 12/074,967

(22) Filed: Mar. 7, 2008

(65) Prior Publication Data

US 2009/0071775 A1    Mar. 19, 2009

(30) Foreign Application Priority Data

Sep. 14, 2007    (JP) ............................. 2007-239023

(51) Int. Cl.
*F16F 9/44* (2006.01)

(52) U.S. Cl. ................................. 188/282.3

(58) Field of Classification Search ... 188/282.1–282.6, 188/319.1, 322.15
See application file for complete search history.

(56) References Cited

U.S. PATENT DOCUMENTS

| | | | | |
|---|---|---|---|---|
| 4,460,074 A | * | 7/1984 | Muller et al. ............ | 188/282.6 |
| 4,953,671 A | * | 9/1990 | Imaizumi ................. | 188/282.3 |
| 5,307,907 A | * | 5/1994 | Nakamura et al. ....... | 188/282.1 |
| 5,497,862 A | * | 3/1996 | Hoya ........................ | 188/282.5 |
| 5,529,154 A | * | 6/1996 | Tanaka .................... | 188/282.6 |
| 5,855,258 A | * | 1/1999 | Deferme .................. | 188/282.6 |
| 6,959,906 B2 | * | 11/2005 | Hönig et al. .................. | 251/48 |
| 7,322,449 B2 | * | 1/2008 | Yamaguchi .............. | 188/282.3 |
| 2003/0094340 A1 | * | 5/2003 | Dodge ..................... | 188/282.6 |
| 2006/0225976 A1 | * | 10/2006 | Nakadate ................... | 188/266 |

FOREIGN PATENT DOCUMENTS

| | | |
|---|---|---|
| JP | 2002295566 | 10/2002 |
| JP | 2005344734 | 12/2005 |

* cited by examiner

*Primary Examiner*—Christopher P Schwartz
(74) *Attorney, Agent, or Firm*—Orum & Roth LLC

(57) ABSTRACT

In a damping force adjusting structure of a hydraulic shock absorber in which a part of an oil liquid is introduced to a back pressure chamber provided in a back surface side of a damping valve from a back pressure introduction path, a pressure within the back pressure chamber is leaked from a leak path, and a damping force can be adjusted by controlling a valve opening pressure of the damping valve by controlling the pressure in the back pressure chamber. A leaf valve with slit is provided in the back pressure introduction path, and a slit provided in the leaf valve with slit is formed as an introduction side orifice.

11 Claims, 4 Drawing Sheets

DAMPING FORCE ADJUSTING STRUCTURE OF HYDRAULIC SHOCK ABSORBER

BACKGROUND OF THE INVENTION

1. Field of the Invention

The present invention relates to a damping force adjusting structure of a hydraulic shock absorber.

2. Description of the Related Art

In a damping force adjusting structure of a hydraulic shock absorber, there may be a structure provided with a cylinder which is filled with an oil liquid, a piston which is slidably fitted into the cylinder, and a piston rod in which one end is coupled to the piston and the other end is extended to an outer portion of the cylinder. A main disc valve may also be provided which controls a flow of the oil liquid generated by a sliding motion of the piston so as to generate a damping force. A back pressure chamber applies an internal pressure in a valve closing direction of the main disc valve, introducing a part of the oil liquid to the back pressure chamber, and controlling a valve opening of the main disc valve, as described in Japanese Patent Application Laid-Open No. 2005-344734 (patent document 1). In this damping force adjusting structure, a pilot oil path introducing the oil liquid to the back pressure chamber is pieced in the main disc valve, and a sub valve directly opening and closing the pilot oil path is provided in a back surface side of the main disc valve. Since the internal pressure of the back pressure chamber is not increased when the sub valve doses the pilot oil path, the valve opening pressure of the main disc valve becomes lower, and the damping force becomes lower. When the sub valve opens the pilot oil path, the internal pressure of the back pressure chamber is increased, the valve opening pressure of the main disc valve becomes higher, and the damping force becomes higher.

Further, in this damping force adjusting structure, there is provided a leak path leaking the pressure within the back pressure chamber upon reaching a predetermined pressure, and a normally closed relief valve is provided in the leak path. Accordingly, if the pressure in the back pressure chamber reaches the predetermined pressure, the relief valve is opened so as to leak the pressure in the back pressure chamber, thereby preventing an excessive ascent of the valve opening pressure of the main disc valve, that is, the damping force.

In the damping force adjusting structure described in patent document 1, the pilot oil path pieced in the main disc valve is set to a back pressure introduction path to the back pressure chamber, and the back pressure introduction path is opened and closed by the sub disc valve. The pressure of the back pressure chamber is set on the basis of a valve rigidity of the sub disc valve and a magnitude of the pilot oil path of the main disc valve, and it is therefore difficult to control the pressure in the back pressure chamber.

Further, the normally closed relief valve is provided in the leak path leaking the pressure within the back pressure chamber. A leak amount of the pressure within the back pressure chamber is set on the basis of the valve rigidity of the relief valve, and it is therefore difficult to control the pressure in the back pressure chamber.

SUMMARY OF THE INVENTION

An object of the present invention is to easily control a pressure in a back pressure chamber while adjusting damping force by controlling the pressure in the back pressure chamber provided in a back surface side of a damping valve, in a damping force adjusting structure of a hydraulic shock absorber.

The present invention relates to a damping force adjusting structure of a hydraulic shock absorber in which an oil liquid is accommodated in a cylinder. A piston is provided in an insertion end of a piston rod which is inserted to the cylinder and is slidably fitted and inserted to the cylinder. A damping force is generated by controlling an oil liquid flow generated by a sliding motion of the piston by means of a damping valve. A part of the oil liquid is introduced to a back pressure chamber provided in a back surface side of the damping valve from a back pressure introduction path. Pressure within the back pressure chamber is leaked from a leak path, and the damping force is adjustable by controlling a valve opening pressure of the damping valve by controlling the pressure in the back pressure chamber. A leaf valve with at least one slit is provided in said back pressure introduction path. The slit provided in the leaf valve having a slit is formed as an introduction side orifice.

BRIEF DESCRIPTION OF THE DRAWINGS

The present invention will be more fully understood from the detailed description given below and from the accompanying drawings which should not be taken to be a limitation on the invention, but are for explanation and understanding only.

FIGS. 4A and 4B show a damping force generating state, in which FIG. 4A is a cross sectional view showing an expansion stroke, and FIG. 4B is a cross sectional view showing a compression stroke.

DESCRIPTION OF THE PREFERRED EMBODIMENTS

Figure 1:
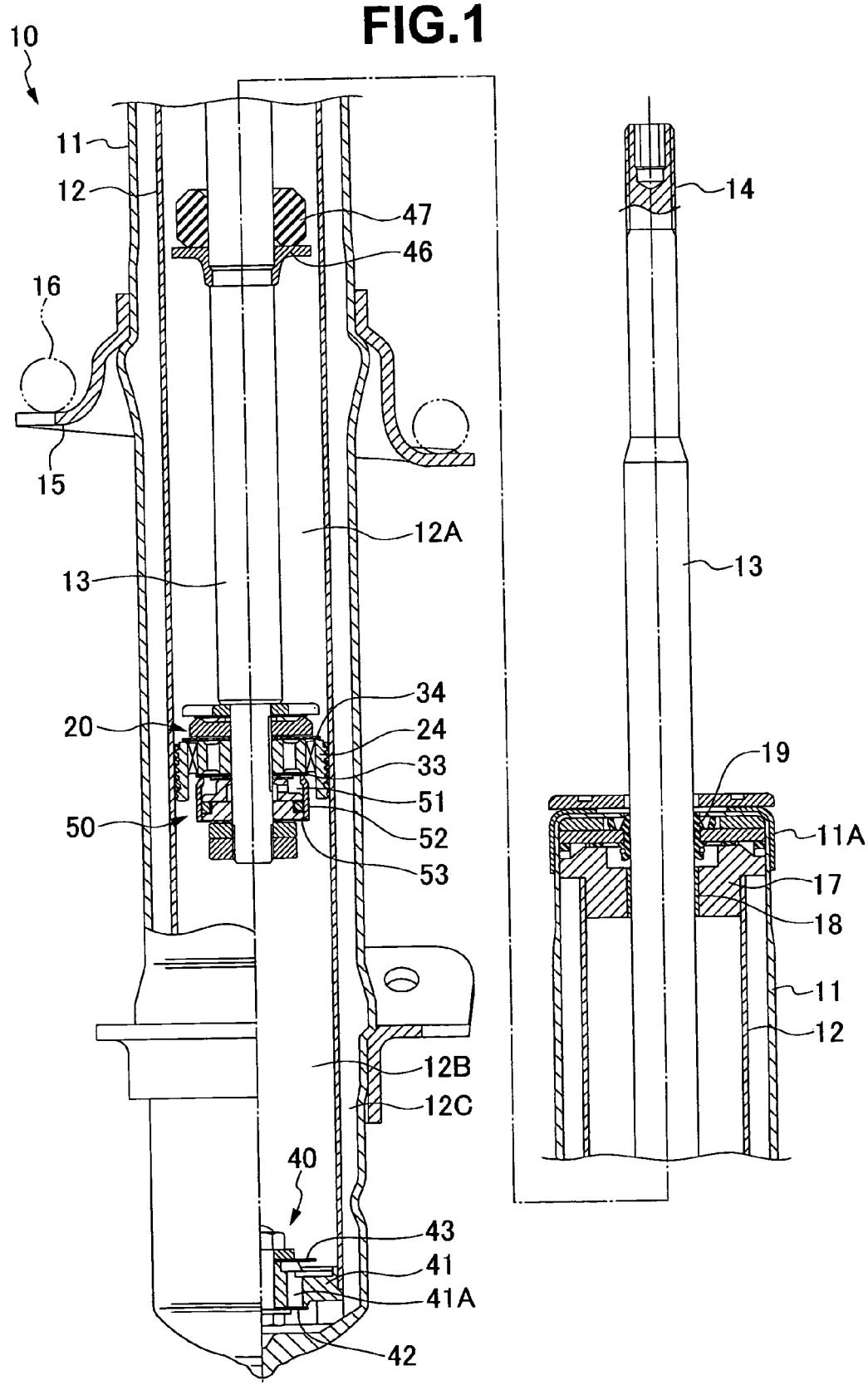
FIG. 1 is a cross sectional view showing a hydraulic shock absorber.

A damping force adjusting type hydraulic shock absorber 10 is of a double cylinder type in which a damper tube 11 has a cylinder 12 built-in, as shown in FIG. 1, and is structured such that a piston rod 13 is inserted to the cylinder 12 accommodating an oil liquid therein. An axle side attaching portion is provided in a lower portion of the damper tube 11, and a vehicle body side attaching portion 14 is provided in an upper portion of the piston rod 13, thereby constructing a suspension apparatus of a vehicle.

The hydraulic shock absorber 10 interposes a suspension spring 16 between a lower spring seat 15 in an outer periphery of the damper tube 11, and an upper spring seat (not shown) provided in the vehicle body side attaching portion 14 in the upper end portion of the piston rod 13.

The hydraulic shock absorber 10 pinches and fixes a rod guide 17, a bush 18 and an oil seal 19 for the piston rod 13 inserted to the cylinder 12 between an upper end caulking portion 11A of the damper tube 11 and an upper end portion of the cylinder 12.

The damping force adjusting type hydraulic shock absorber 10 has a piston valve apparatus 20 and a bottom valve apparatus 40. The piston valve apparatus 20 and the bottom valve apparatus 40 controls an oil liquid flow generated by a sliding motion of the cylinder 12 by a piston 24 mentioned below and is provided in an insertion end to the cylinder 12 of the piston rod 13 so as to generate a damping force. The inventive structure controls a stretching vibration of the piston rod 13 caused by an absorption of an impact force by the suspension spring 16 on the basis of the damping force generated thereby.

(Piston Valve Apparatus 20)

The piston valve apparatus 20 has a thread portion 21 in an outer periphery of the insertion end of the cylinder 12 of the piston rod 13. A spacer 22, a valve stopper 23, a piston 24, valve stoppers 25 and 26 and a spacer 27 are inserted and attached to an outer periphery of the thread portion 21, and they are pinched and fixed to a base end step portion of the thread portion 21 by a nut 28 screwed to the thread portion 21.

The piston 24 is slidably fitted and inserted to the cylinder 12, and is provided with an expansion side flow path 31 and a compression side flow path 32. An annular center portion of a disc valve shaped expansion side damping valve 33 is pinched between the piston 24 and the valve stopper 25, and an annular center portion of a disc valve shaped compression side damping valve 34 is pinched between the piston 24 and the valve stopper 23. In other words, the piston valve apparatus 20 compartmentalizes an inner side of the cylinder 12 into a rod side chamber 12A and a piston side chamber 12B by the piston 24. The rod side chamber 12A and the piston side chamber 12B are communicated respectively via the expansion side flow path 31 provided in the piston 24 and the expansion side damping valve 33 opening and closing the expansion side flow path 31, and the compression side flow path 32 and the compression side damping valve 34 opening and closing the compression side flow path 32. The compression side damping valve 34 is provided with a hole 34A communicating the rod side chamber 12A with the expansion side flow path 31.

Figure 4A:
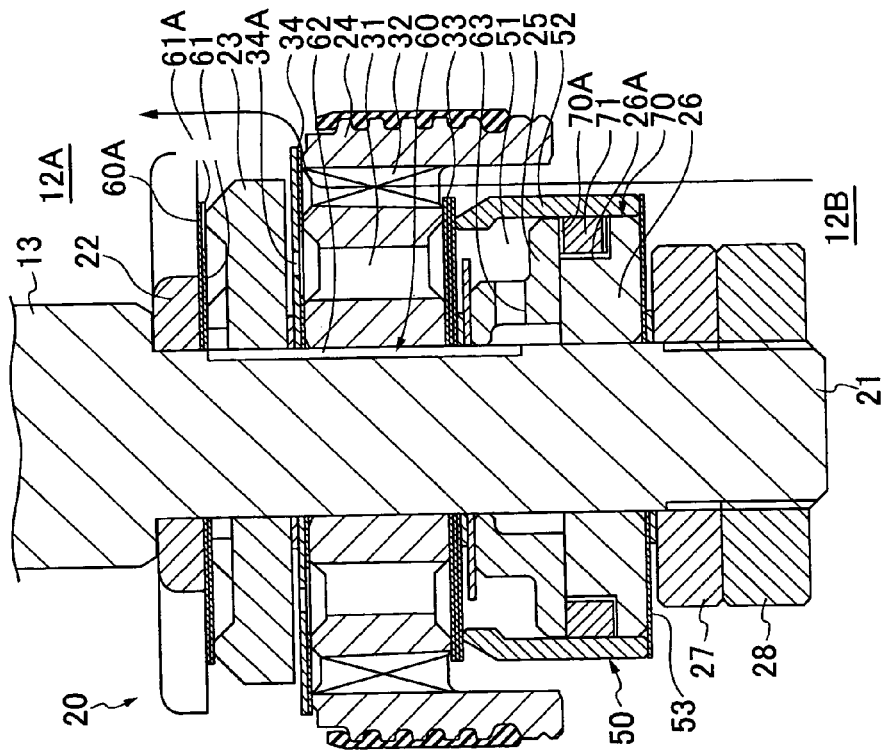
Figure 4B:
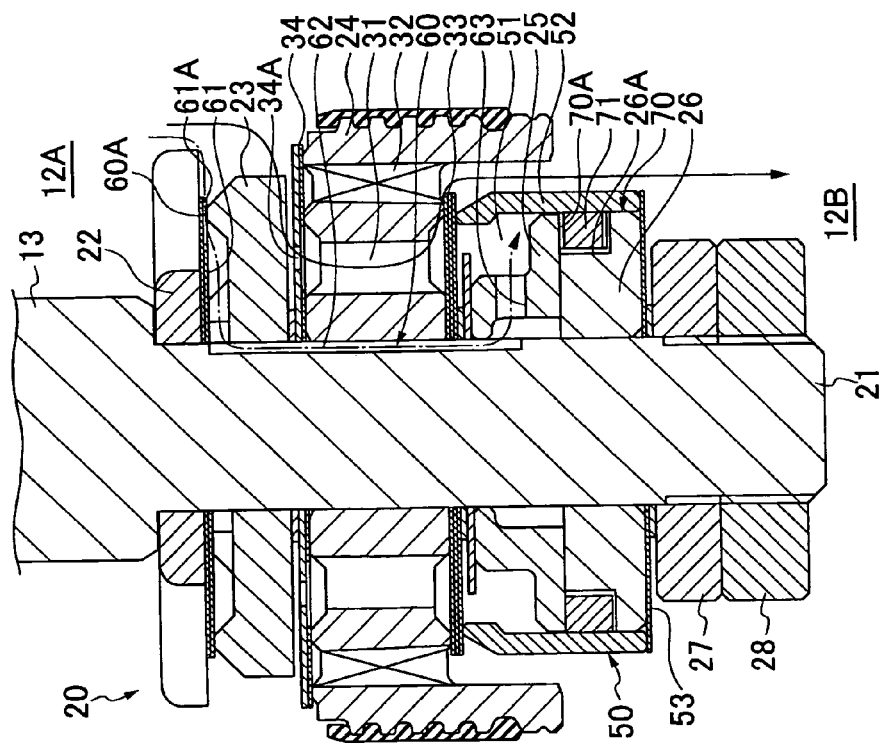

Accordingly, at a time of the expansion, as shown in FIG. 4A, the oil in the rod side chamber 12A passes through the expansion side flow path 31 of the piston 24 from the hole 34A of the compression side damping valve 34, deflects the expansion side damping valve 33 so as to open, is introduced to the piston side chamber 12B, and generates the expansion side damping force. Further, during compression, as shown in FIG. 4B, the oil in the piston side chamber 12B passes through the compression side flow path 32 of the piston 24, deflects the compression side damping valve 34 so as to open, is introduced to the rod side chamber 12A, and generates the compression side damping force.

(Bottom Valve Apparatus 40)

The hydraulic shock absorber 10 sets a gap between the damper tube 11 and the cylinder 12 to a reservoir chamber 12C, and compartmentalizes an inner portion of the reservoir chamber 12C into an oil chamber and a gas chamber. Further, the bottom valve apparatus 40 is structured such that a bottom piece 41 compartmentalizing the piston side chamber 12B and the reservoir chamber 12C in the inner portion of the cylinder 12 is arranged between a lower end portion of the cylinder 12 and a bottom portion of the damper tube 11. A space between the bottom portion of the damper tube 11 and the bottom piece 41 can be communicated with the reservoir chamber 12C by a flow path provided in the bottom piece 41.

The bottom valve apparatus 40 is provided with a disc valve 42 and a check valve 43 serving as bottom valves respectively opening and closing a compression side flow path 41A and an expansion side flow path (not shown) provided in the bottom piece 41.

During expansion, oil in an exiting amount of the piston rod 13 exiting from the cylinder 12 pushes open the check valve 43, and is supplied to the piston side chamber 12B from the reservoir chamber 12C via the expansion side flow path (not shown) of the bottom piece 41. During compression, oil at an entering amount of the piston rod 13 entering into the cylinder 12 deflects the disc valve 42 from the piston side chamber 12B through the compression side flow path 4A of the bottom piece 41 so as to open, and is pushed out to the reservoir chamber 12C, and compression side damping force is thereby obtained.

In this case, the hydraulic shock absorber 10 is provided with a rebound rubber 47 compression deformed during extension of the piston rod 13 (a maximum expanded state of the hydraulic shock absorber 10) on a rebound seat 46 fixed to a side (a lower side) of the piston 24, around the piston rod 13 positioned in the rod side chamber 12A of the cylinder 12.

Accordingly, the hydraulic shock absorber 10 is provided with a damping force adjusting apparatus 50 for adjusting an expansion side damping force of the piston valve apparatus 20 in the following manner.

Figure 2:
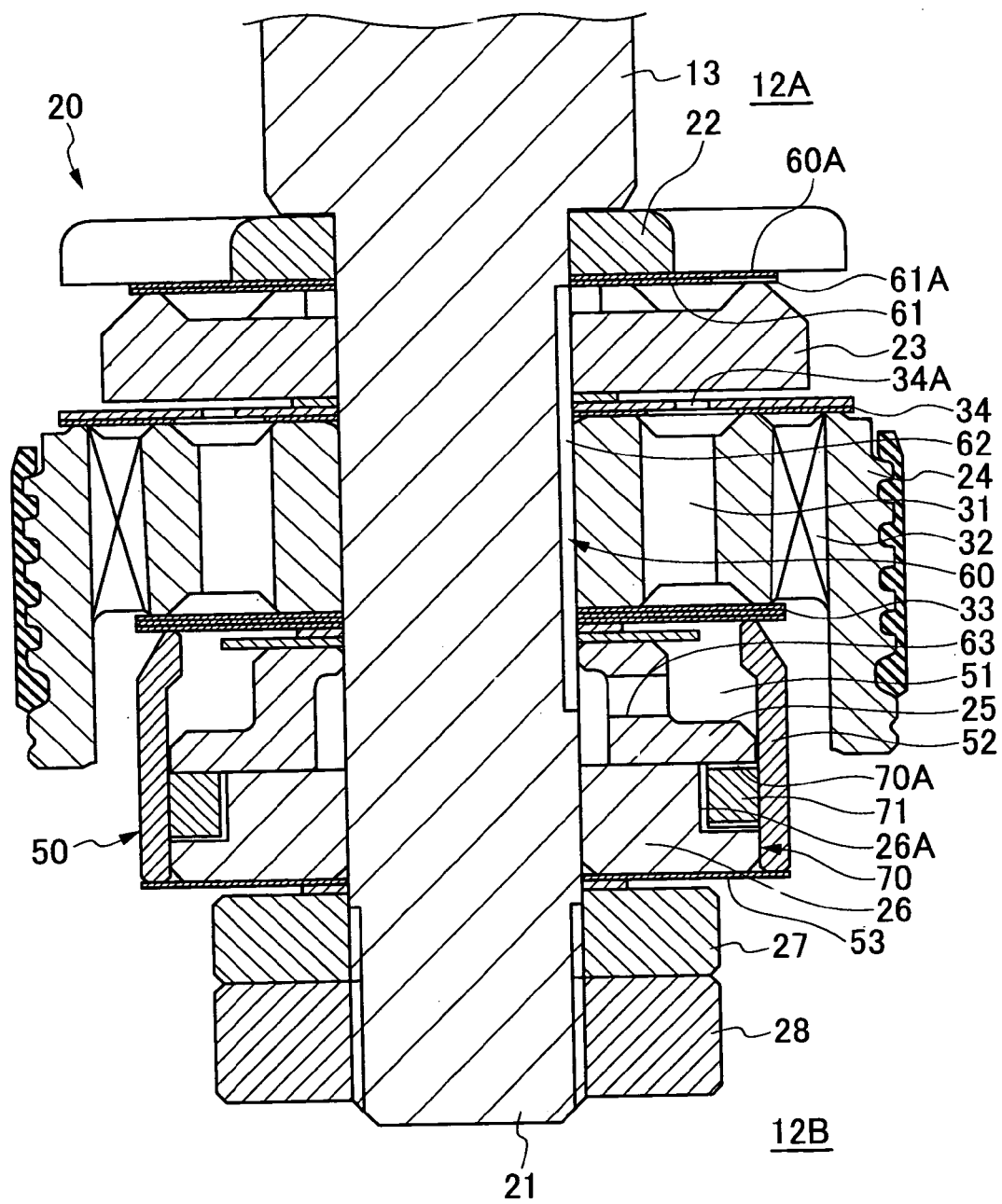
FIG. 2 is a cross sectional view showing a damping force adjusting structure in FIG. 1.

The damping force adjusting apparatus 50 is provided with an expansion side back pressure chamber 51 in a back surface side with respect to the expansion side flow path 31 of the expansion side damping valve 33, as shown in FIG. 2. In the present embodiment, the expansion side back pressure chamber 51 is formed by an outer peripheral diameter-reduced portion of the valve stopper 25 provided in a back surface of the expansion side damping valve 33. A backup collar 52 is provided in outer peripheries of the valve stoppers 25 and 26 so as to slide via a sliding gap forming a leak path 70 mentioned below. A front surface of the backup collar 52 is energized and applied to the expansion side damping valve 33 by an annular leaf spring 53 (a spring) provided in a back surface of the backup collar 52. At this time, it is preferable that the pressure receiving surface at which the expansion side damping valve 33 faces to the expansion side flow path 31 is equal to or slightly greater than a pressure receiving area facing to the expansion side back pressure chamber 51.

The damping force adjusting apparatus 50 is provided with a back pressure introduction path 60 communicating the rod side chamber 12A with the expansion side back pressure chamber 51 in an insertion end of the piston rod 13. The back pressure introduction path 60 communicates a slit 61A of a leaf valve with slit 61 mentioned below and pinched between the spacer 22 and the valve stopper 23, a vertical groove 62 provided in the insertion end of the piston rod 13, and a horizontal hole 63 provided in the valve stopper 25 in sequence, and the back pressure introduction path 60 is formed in such a manner as to open the slit 61A of the leaf valve 61 with slit to the rod side chamber 12A and open the horizontal hole 63 to the expansion side back pressure chamber 51.

The damping force adjusting apparatus 50 introduces a part of the oil liquid in the rod side chamber 12A to the expansion side back pressure chamber 51 provided in the back surface side of the expansion side damping valve 33 from the back pressure introduction path 60. Pressure is leaked within the back pressure chamber 51 to the piston side chamber 12B from the leak path 70, which controls the valve opening pressure of the expansion side damping valve 33 by controlling the pressure in the expansion side back pressure chamber 51, thereby adjusting the expansion side damping force.

In this case, in the damping force adjusting apparatus 50, the leaf valve with slit 61 is provided in the back pressure introduction path 60. The leaf valve with slit 61 in accordance with the present embodiment is formed as a laminated shape having a plurality of thin plates so as to be pinched between the spacer 22 and the valve stopper 23. It is structured by setting the slit 61A at one position or a plurality of positions in a circumferential direction of an outer edge of the lowest layer side thin plate which directly comes into contact with the valve stopper 23. The slit 61A of the leaf valve with slit 61 forms an introduction side orifice 60A when introducing the oil liquid in the rod side chamber 12A to the expansion side back pressure chamber 51.

When piston speed of the hydraulic shock absorber 10 (a moving speed of the piston 24) comes to a high-frequency input, the oil liquid in the rod side chamber 12A is difficult to introduce to the expansion side back pressure chamber 51 due to a resistance of the introduction side orifice 60A of the slit 61A, and the pressure in the back pressure chamber 51 is not increased. When the piston speed of the hydraulic shock absorber 10 come to a low-frequency input, the oil liquid in the rod side chamber 12A easily passes through the introduction side orifice 60A of the slit 61A so as to be easily introduced to the expansion side back pressure chamber 51, and the pressure in the back pressure chamber 51 is increased, as shown in FIG. 4A.

Further, in the damping force adjusting apparatus 50, the backup collar 52 forms a sliding gap between the valve stoppers 25 and 26, and the leak path 70 leaking the pressure in the expansion side back pressure chamber 51 to the piston side chamber 12B is constructed by the sliding gap. At this time, the valve stoppers 25 and 26 are provided with the same outer periphery, and an annular groove 26A is formed in an outer periphery of the valve stopper 26 by closing an outer peripheral diameter-reduced portion provided in a side of a mating face coming into contact with an end surface of the valve stopper 25 in the valve stopper 26 by the end surface of the valve stopper 25. Further, a seal ring 71 with which the backup collar 52 comes into slidable contact is provided in the annular groove 26A in the outer periphery of the valve stopper 26. The seal ring 71 is provided with an outer periphery with which the backup collar 52 comes into slidable contact, and an inner periphery which forms an annular gap between a groove bottom of the annular groove 26A. An orifice groove is formed at one position or a plurality of positions in a circumferential direction of upper and lower surfaces facing to both groove side surfaces sandwiching the groove bottom of the annular groove 26A therebetween. A leak side orifice 70A is formed by the annular gap and the orifice groove, and the leak side orifice 70A is formed as a part of the leak path 70.

The damping force adjusting apparatus 50 makes a flow path area of the leak side orifice 70A smaller than the introduction side orifice 60A, and maintains the pressure in the expansion side back pressure chamber 51 introduced via the introduction side orifice 60A constant on the basis of the resistance of the leak side orifice 70A.

Figure 3:
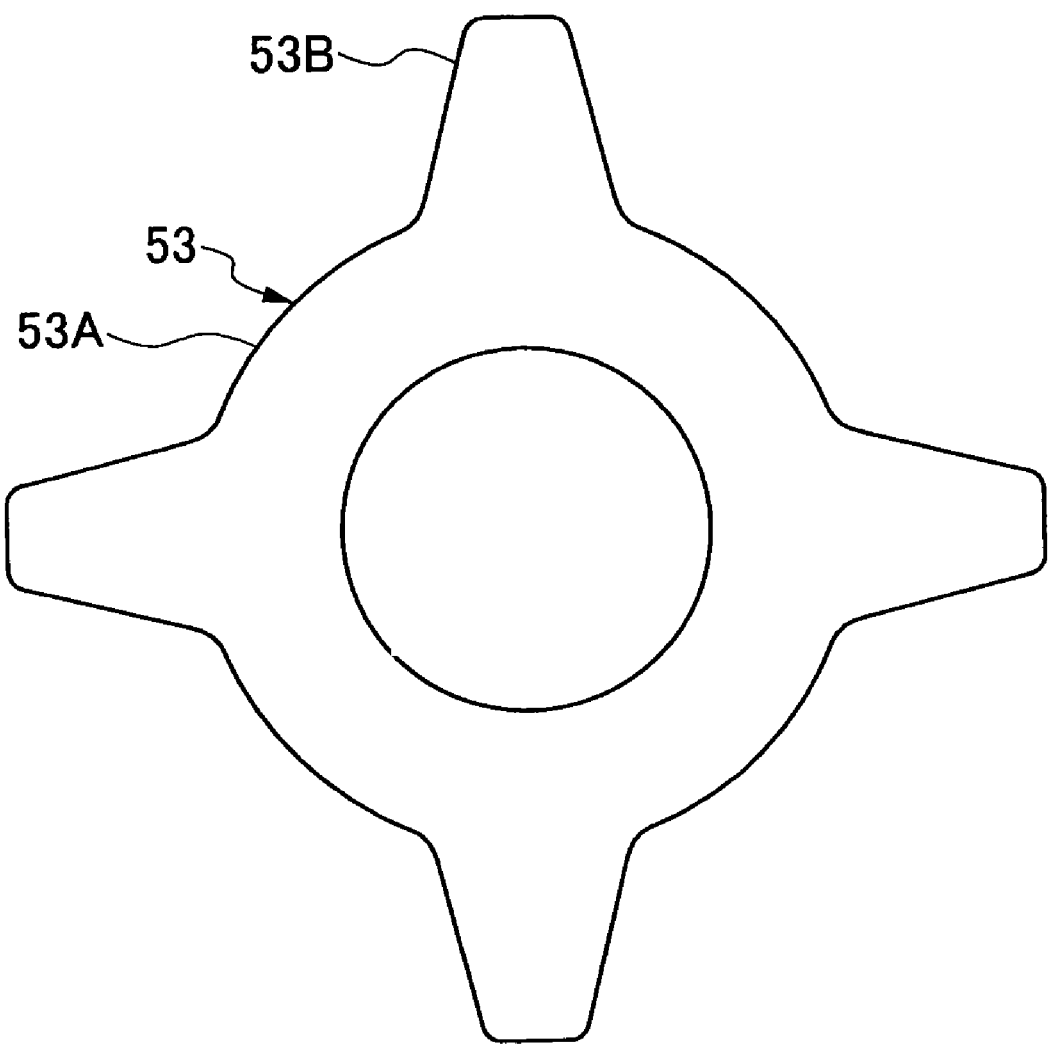
FIG. 3 is a plan view showing a leaf spring.

Further, in the damping force adjusting apparatus 50, the annular leaf spring 53 mentioned above and provided in the back surface of the backup collar 52 is provided with an annular center base portion 53A pinched and fixed between the valve stopper 26 and the spacer 27 in the back surface side of the valve stopper 26. A tongue portion 53B protrudes to an outer side from a plurality of positions (our positions forming a cross shape in the present embodiment) in an outer periphery of the base portion 53A so as to press the back surface of the backup collar 52, as shown in FIG. 3. The tongue portion 53B of the leaf spring 53 is brought into contact with a plurality of positions in a circumferential direction of the back surface of the backup collar 52 in a previous pressure contact elastically bent state. The leaf spring 53 lowers a spring rigidity of the tongue portion 53B pressing the back surface of the backup collar 52, and lowers a preload applied to the backup collar 52.

Accordingly, the damping force adjusting apparatus 50 is actuated as follows.

(1) When the piston speed of the hydraulic shock absorber 10 (the moving speed of the piston 24) reaches a high-frequency input, the oil liquid in the rod side chamber 12A is difficult to introduce to the expansion side back pressure chamber 51 due to the resistance of the introduction side orifice 60A of the slit 61A, and the pressure in the back pressure chamber 51 is not increased. Accordingly, the valve opening pressure of the expansion side damping valve 33 becomes low, the expansion side damping valve 33 is easily opened, and the expansion side damping force of the expansion side damping valve 33 becomes lower.

(2) When the piston speed of the hydraulic shock absorber 10 reaches the low-frequency input, the oil liquid in the rod side chamber 12A easily passes through the introduction side orifice 60A of the slit 61A so as to be easily introduced to the expansion side back pressure chamber 51. The pressure in the back pressure chamber 51 is increased, whereby the valve opening pressure of the expansion side damping valve 33 becomes higher, the expansion side damping valve 33 is difficult to open, and the expansion side damping force of the expansion side damping valve 33 becomes higher.

(3) The pressure in the expansion side back pressure chamber 51 is leaked to the piston side chamber 12B from the leak side orifice 70A of the leak path 70 formed by the seal ring 71 for the backup collar 52 provided in the outer peripheries of the valve stoppers 25 and 26. The leak amount of the pressure in the expansion side back pressure chamber 51 is stably controlled by the leak side orifice 70A. It is possible to maintain the pressure in the back pressure chamber 51 constant, and it is possible to stably maintain the damping force characteristic of the expansion side damping valve 33.

In accordance with the present embodiment, the following operations and effects can be obtained.

(a) In the damping force adjusting structure of the hydraulic shock absorber 10, the leaf valve with slit 61 is provided in the back pressure introduction path 60 introducing a part of the oil liquid to the back pressure chamber 51 while adjusting the damping force by controlling the pressure in the back pressure chamber 51 provided in the back pressure side of the expansion side damping valve 33, and the slit 61A provided in the leaf valve with slit 61 is formed as the introduction side orifice 60A. It is possible to easily coordinate the introduction side orifice 60A chosen in accordance with a magnitude of the slit 61A of the leaf valve with slit 61, and it is possible to easily control the pressure in the back pressure chamber 51. Further, since it is possible to easily carry out an adjustment of the pressure introduction side orifice 60A, it is possible to adjust the speed of pressure propagation to the back pressure chamber 51. It is possible to easily carry out an adjustment of a frequency response, and it is possible to easily carry out a frequency depending type damping force adjustment.

(b) During the generation of the back pressure chamber 51 by the backup collar 52 sliding on the valve stoppers 25 and 26 in the back surface of the expansion side damping valve 33, and forming the leak path 70 leaking the pressure in the back pressure chamber 51 in the outer peripheries of the valve stoppers 25 and 26, the seal ring 71 with which the backup collar 52 comes into slidable contact is provided in the outer peripheries of the valve stoppers 25 and 26. The seal ring 71 is provided with the leak side orifice 70A forming a part of the leak path 70. It is possible to easily coordinate the leak side orifice 70A of the seal ring 71, and it is possible to easily control the pressure in the back pressure chamber 51. Further, since it is possible to easily carry out the adjustment of the leak side orifice 70A, it is possible to adjust the leak amount from the back pressure chamber 51. It is possible to easily carry out the adjustment of the frequency response together with the introduction side orifice 60A, and it is possible to easily carry out the frequency depending type damping force adjustment.

(c) The leak amount of the pressure from the leak path 70 can be stably controlled by the leak side orifice 70A of the seal ring 71 regardless of a dimensional precision of the sliding gap affected by the working precisions of the backup collar 52 and the valve stoppers 25 and 26. It is possible to stably control the leak amount of the pressure, and the pressure in the back pressure chamber 51. It is also possible to stably maintain the damping force characteristic of the expansion side damping valve 33, without the necessity of increasing the working precisions of the valve stoppers 25 and 26 and the backup collar 52.

(d) Since the back surface of the backup collar 52 is pressed by the tongue portion 53B in the outer periphery of the leaf spring 53, it is possible to reduce the damping force of the expansion side damping valve 33, by lowering the spring rigidity of the leaf spring 53 and reducing the preload applied to the backup collar 52 by the leaf spring 53.

(e) Since the tongue portion 53B of the leaf spring 53 only holds a part in the circumferential direction of the back surface of the backup collar 52, the tongue portion 53B does not close the leak path, 70 constituted by the sliding gap of the valve stoppers 25 and 26 and the backup collar 52. Accordingly, it is not necessary to form any particular notch-shaped leak path 70 or the like in the leaf spring 53 provided in the back surfaces of the valve stoppers 25 and 26 and the backup collar 52.

As heretofore explained, embodiments of the present invention have been described in detail with reference to the drawings. However, the specific configurations of the present invention are not limited to the embodiments but those having a modification of the design within the range of the present invention are also included in the present invention. The damping force adjusting structure in accordance with the present invention is not limited to the structure achieved by setting the expansion side back pressure chamber 51 in the back surface side of the expansion side damping valve 33 such as the embodiment mentioned above. It can be achieved in the same manner as the embodiment mentioned above, by setting the compression side back pressure chamber in the back surface side of the compression side damping valve 34, or setting each of the expansion side back pressure chamber and the compression side back pressure chamber in the back surface sides of both the expansion side damping valve 33 and the compression side damping valve 34.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A damping force adjusting structure of a hydraulic shock absorber in which an oil liquid is accommodated in a cylinder, a piston provided in an insertion end of a piston rod inserted to the cylinder is slidably fitted and inserted to the cylinder, a damping force is generated by controlling an oil liquid flow generated by a sliding motion of the piston by a damping valve, a part of the oil liquid is introduced to a back pressure chamber provided in a back surface side of the damping valve from a back pressure introduction path, a pressure within the back pressure chamber is leaked from a leak path, and the damping force is adjustable by controlling a valve opening pressure of the damping valve by controlling the pressure in the back pressure chamber, wherein said back pressure introduction path is provided in the piston rod, a leaf valve with a slit is provided at an inlet of said back pressure introduction path, and said slit is formed as an introduction side orifice.

2. A damping force adjusting structure of a hydraulic shock absorber according to claim 1, wherein a valve stopper is provided in a back surface of said damping valve, a backup collar sliding via a sliding gap forming the leak path is provided in an outer periphery of the valve stopper, a spring is provided in a back surface of the backup collar, and the back pressure chamber is formed by pressing a front surface of the backup collar to the damping valve by the spring, and wherein a seal ring with which the backup collar comes into slidable contact is provided in the outer periphery of the valve stopper, and a leak side orifice forming a part of the leak path is provided in the seal ring.

3. A damping force adjusting structure of a hydraulic shock absorber according to claim 2, wherein said spring is constituted by a leaf spring, and is provided with a base portion fixed to the back surface side of the valve stopper, and a tongue portion protruding from a plurality of positions in an outer periphery of the base portion so as to press the back surface of the backup collar.

4. A damping force adjusting structure of a hydraulic shock absorber according to claim 3, wherein said leaf valve with slit is formed as a laminated shape having a plurality of thin plates, and said leaf valve is structured by forming a slit at one position or a plurality of positions in a circumferential direction of an outer edge of the thin plate in the lowest layer side facing to the back pressure introduction path.

5. A damping force adjusting structure of a hydraulic shock absorber according to claim 4, wherein an inner side of the cylinder is compartmentalizeded into a rod side chamber and a piston side chamber by said piston, said back pressure introduction path communicates a slit of said leaf valve with slit, a vertical groove provided in an insertion end of the piston rod, and a horizontal hole provided in said valve stopper in sequence, and is formed in such a manner as to open the slit of the leaf valve with slit to the rod side chamber and open the horizontal hole to the back pressure chamber.

6. A damping force adjusting structure of a hydraulic shock absorber according to claim 3, wherein an inner side of the cylinder is compartmentalizeded into a rod side chamber and a piston side chamber by said piston, said back pressure introduction path communicates a slit of said leaf valve with slit, a vertical groove provided in an insertion end of the piston rod, and a horizontal hole provided in said valve stopper in sequence, and is formed in such a manner as to open the slit of the leaf valve with slit to the rod side chamber and open the horizontal hole to the back pressure chamber.

7. A damping force adjusting structure of a hydraulic shock absorber according to claim 2, wherein said leaf valve with slit is formed as a laminated shape having a plurality of thin plates, and said leaf valve is structured by forming a slit at one position or a plurality of positions in a circumferential direction of an outer edge of the thin plate in the lowest layer side facing to the back pressure introduction path.

8. A damping force adjusting structure of a hydraulic shock absorber according to claim 7, wherein an inner side of the cylinder is compartmentalizeded into a rod side chamber and a piston side chamber by said piston, said back pressure introduction path communicates a slit of said leaf valve with slit, a vertical groove provided in an insertion end of the piston rod, and a horizontal hole provided in said valve stopper in sequence, and is formed in such a manner as to open the slit of the leaf valve with slit to the rod side chamber and open the horizontal hole to the back pressure chamber.

9. A damping force adjusting structure of a hydraulic shock absorber according to claim 2, wherein an inner side of the cylinder is compartmentalized into a rod side chamber and a piston side chamber by said piston, said back pressure introduction path communicates a slit of said leaf valve with slit, a vertical groove provided in an insertion end of the piston rod, and a horizontal hole provided in said valve stopper in sequence, and is formed in such a manner as to open the slit of the leaf valve with slit to the rod side chamber and open the horizontal hole to the back pressure chamber.

10. A damping force adjusting structure of a hydraulic shock absorber according to claim 1, wherein said leaf valve with slit is formed as a laminated shape having a plurality of thin plates, and said leaf valve is structured by forming a slit at one position or a plurality of positions in a circumferential direction of an outer edge of the thin plate in the lowest layer side facing to the back pressure introduction path.

11. A damping force adjusting structure of a hydraulic shock absorber according to claim 10, wherein an inner side of the cylinder is compartmentalizeded into a rod side chamber and a piston side chamber by said piston, said back pressure introduction path communicates a slit of said leaf valve with slit, a vertical groove provided in an insertion end of the piston rod, and a horizontal hole provided in said valve stopper in sequence, and is formed in such a manner as to open the slit of the leaf valve with slit to the rod side chamber and open the horizontal hole to the back pressure chamber.

* * * * *